United States Patent [19]

Alario et al.

[11] Patent Number: 6,045,689
[45] Date of Patent: Apr. 4, 2000

[54] PROCESS FOR CATALYTIC CONVERSION OF HYDROCARBONS INTO AROMATIC COMPOUNDS WITH A CATALYST CONTAINING SILICON

[75] Inventors: Fabio Alario, Neuilly-S/-Seine; Jean-Marie Deves, Vernouillet; Patrick Euzen, Paris, all of France

[73] Assignee: Institut Francais du Petrole, Rueil Malmaison, France

[21] Appl. No.: 08/973,402

[22] PCT Filed: Jun. 14, 1996

[86] PCT No.: PCT/FR96/00919

§ 371 Date: Dec. 15, 1997

§ 102(e) Date: Dec. 15, 1997

[87] PCT Pub. No.: WO97/00306

PCT Pub. Date: Jan. 3, 1997

[30] Foreign Application Priority Data

| Jun. 16, 1995 | [FR] | France | 95 07182 |
| Jun. 16, 1995 | [FR] | France | 95 07186 |
| Jun. 16, 1995 | [FR] | France | 95 07189 |
| Jun. 16, 1995 | [FR] | France | 95 07188 |

[51] Int. Cl.[7] .......................... C10G 35/06; C10G 35/085
[52] U.S. Cl. .......................... 208/139; 208/134; 208/135; 208/136; 208/137; 208/138; 585/418; 585/419; 585/420; 585/421
[58] Field of Search ............................. 208/134, 135, 208/136, 137, 138, 139; 585/418, 419, 420, 421

[56] References Cited

U.S. PATENT DOCUMENTS

| 3,177,136 | 4/1965 | Lang et al. ................. 208/139 |
| 3,915,845 | 10/1975 | Antos . |
| 3,972,805 | 8/1976 | Wilhelm . |
| 3,972,806 | 8/1976 | Antos . |
| 4,032,587 | 6/1977 | Antos . |
| 4,039,477 | 8/1977 | Engelhard et al. . |
| 4,165,276 | 8/1979 | Antos . |
| 4,190,557 | 2/1980 | Antos . |
| 4,290,921 | 9/1981 | Antos . |
| 4,966,682 | 10/1990 | Baird, Jr. et al. ............ 208/139 |
| 4,966,879 | 10/1990 | Baird, Jr. ................... 502/226 |
| 4,966,880 | 10/1990 | Baird, Jr. et al. . |
| 4,966,881 | 10/1990 | Baird, Jr. ................... 502/252 |
| 4,968,408 | 11/1990 | Baird, Jr. ................... 208/139 |
| 5,013,704 | 5/1991 | Baird, Jr. et al. ............ 502/241 |
| 5,015,614 | 5/1991 | Baird, Jr. et al. ............ 502/250 |
| 5,227,357 | 7/1993 | Sun et al. . |
| 5,665,223 | 9/1997 | Bogdan ..................... 208/138 |

FOREIGN PATENT DOCUMENTS

| 0 034 228 | 8/1981 | European Pat. Off. . |
| 0 068 708 | 6/1982 | European Pat. Off. . |
| 0 407 117 | 1/1991 | European Pat. Off. . |
| 0 601 399 | 6/1994 | European Pat. Off. . |
| 2 187 887 | 1/1974 | France . |
| 2 280 426 | 2/1976 | France . |
| 2464095 | 3/1981 | France . |
| 2 481 612 | 11/1981 | France . |
| 2 483 254 | 12/1981 | France . |
| 2 659 569 | 9/1991 | France . |
| 2008431 | 6/1979 | United Kingdom . |
| 2 120 572 | 12/1983 | United Kingdom . |

OTHER PUBLICATIONS

U.S. application No. 08/973,406, filed Dec. 15, 1997.
U.S. application No. 08/973,407, filed Dec. 15, 1997.
U.S. application No. 08/973,403, filed Dec. 15, 1997.
U.S. application No. 08/973,404, filed Dec. 15, 1997.

*Primary Examiner*—Walter D. Griffin
*Attorney, Agent, or Firm*—Oblon, Spivak, McClelland, Maier & Neustadt, P.C.

[57] ABSTRACT

A process for converting hydrocarbons into aromatic compounds, which entails contacting a composition containing hydrocarbons with a catalyst under temperature and pressure conditions to produce the aromatic compounds, the catalyst containing a matrix of η transition alumina and/or γ transition alumina. The catalyst contains 0.001 to 2 wt % of silicon, 0.1 to 15 wt % of at least one platinum group metal, and 0.005 to 10 wt % of at least one promoter metal. The promoter metals may be tin, germanium, indium, gallium, thallium, antimony, lead, rhenium, manganese, chromium, molybdenium or tungsten. The catalyst may also contain a doping metal.

31 Claims, No Drawings

PROCESS FOR CATALYTIC CONVERSION OF HYDROCARBONS INTO AROMATIC COMPOUNDS WITH A CATALYST CONTAINING SILICON

BACKGROUND OF THE INVENTION

1. Field of the Invention

The present invention concerns a process for catalytic conversion of hydrocarbons into aromatic compounds, which can be used in particular for the reforming of gasolines and the production of aromatics.

More precisely, it concerns a process of this type using as catalyst a multi-functional catalyst with an alumina matrix.

2. Description of the Background

Catalytic reforming is a process which makes it possible to improve the octane number of the oil fractions and in particular of the heavy petroleum from distillation by conversion of n-paraffins and naphthenes into aromatic hydrocarbons.

The operation of catalytic reforming thus consists on the one hand of transforming $C_7$–$C_{10}$ n-paraffins into aromatics and light paraffins and on the other hand $C_7$–$C_{10}$ naphthenes into aromatics and light paraffins. These reactions are illustrated in particular by the conversion by dehydrogenation of cyclohexanes and the dehydroisomerization of alkylcyclopentanes to yield aromatics, methylcyclohexane yielding for example toluene, and also by conversion by cyclization of n-paraffins into aromatics, n-heptane for example yielding toluene.

During catalytic reforming, cracking reactions also take place of heavy n-paraffins into light paraffins leading in particular to $C_1$–$C_4$ products essentially of propane and isobutane: these reactions are detrimental to the yield of reformed product.

Finally, there is also the formation of coke through condensation of aromatic nuclei forming a solid product, rich in carbon which is deposited on the catalyst.

The reforming catalysts are very sensitive, apart from coke, to various poisons which can reduce their activity: in particular sulphur, nitrogen, metals and water.

By being deposited on the surface of the catalyst, the coke brings about a loss in activity with time which leads to higher operating temperatures, a lower yield of reformed products, and a higher gas yield.

Because of this and considering the regeneration of the catalyst, the catalytic reforming process can be put into operation in two different ways: in a semi-regenerating or cyclic manner and in a continuous manner. In the first case, the process is carried out with a fixed bed, in the second with a mobile bed.

In the semi-regenerating process, to compensate for the loss of activity of the catalyst, the temperature is raised progressively and then the installation is stopped in order to carry out the regeneration of the catalyst by eliminating the coke. In cyclic reforming which in fact is a variation of the semi-regenerating process, the installation comprises several reactors in series and each is closed down in turn, the coke deposits are eliminated from the catalyst out of action and the catalyst regenerated while the other reactors continue to operate.

In continuous reforming, the reactors put into operation are moving-bed reactors operating at low pressure (less than 15 bars), which makes it possible to raise considerably the yields of reformed products and hydrogen by encouraging aromatization reactions instead of cracking, but on the other hand the formation of coke is greatly accelerated. The catalyst passes through the reactors then a regenerating action.

The processes for production of aromatics involve conversion reactions of the paraffinic and naphthenic hydrocarbons into aromatic compounds.

In these processes of conversion of hydrocarbons, bi-functional catalysts are generally used containing, for example, platinum and a support of chlorinated alumina, which associate the acidic function of the chlorinated alumina necessary for the reactions of isomerization of cyclopentanic naphthenes and the cyclization of paraffins with the dehydrogenating function of the platinum necessary for the dehydrogenation reactions. Catalysts of this type also including another metal such as rhenium, tin or lead have been described in U.S. Pat. No. 3,700,588 and U.S. Pat. No. 3,415,737.

As it can be seen above, the catalytic reforming processes can be operated either by using a fixed bed or a mobile bed of catalyst.

In each case, the catalyst undergoes a regenerating treatment operating at high temperature and in the presence of steam, which consists among other things of burning off the coke deposited on the catalyst. Unfortunately, these treatment conditions favour degradation of the catalyst. It is thus important to try to raise the resistance of the catalyst under these conditions.

Generally the catalyst is presented in the form of extrusions or balls of a sufficient size to let the reagents and gaseous products pass relatively easily. Wear of the catalyst results, in particular through friction in processes with mobile beds, which provokes the formation of dusts and finer grains. These very fine grains perturb the gaseous flow and make it necessary to raise the entry pressure of the reagents and even, in certain cases, to stop the unit. In mobile bed units, this progressive wear also has the consequence of perturbing the circulation of the catalyst and makes it necessary to top up the catalyst frequently.

A catalyst such as a reforming catalyst must thus satisfy a great number of requirements, certain of which may appear contradictory. This catalyst must first of all provide the greatest activity possible allowing high yields to be obtained, but this activity must also be conjugated with the greatest selectivity possible, that is to say that cracking reactions leading to light products containing from 1 to 4 carbon atoms must be limited.

In addition, the catalyst must be highly stable vis-à-vis its deactivation through coke deposit; the catalyst must also have excellent resistance to degradation when it is submitted to the extreme conditions existing in the repeated regenerating operations it has to undergo.

In the case of the continuous reforming process operating for mobile bed reactors and as mentioned above, the catalysts are also submitted to intense and progressive wear through friction, which leads to a considerable diminution of their specific surface area and the formation of "smalls" which prejudice the functioning of the installation. The catalysts available at present, even if they can fulfill one or several of these conditions, do not satisfy the whole range of the requirements mentioned above.

Also, despite the many improvements already made to the bi-functional catalysts used, one is still looking for new catalysts offering improved performance, not only as far as the yield of conversion reactions is concerned, but also the lifespan of the catalyst.

SUMMARY OF THE INVENTION

The present invention concerns precisely a process for conversion of hydrocarbons using a multi-functional catalyst which presents improved catalytic performance and an extended lifespan in reforming reactions and production of aromatics.

According to the invention, the process for conversion of hydrocarbons into aromatic components consists of putting a load of said hydrocarbons into contact with a catalyst under the temperature and pressure conditions appropriate for said conversion, and it is characterized in that the catalyst comprises:

a matrix constituted of 0 to 100% by weight of $\eta$ transition alumina, the complement to 100% by weight of the matrix being $\gamma$ transition alumina, and compared with the total weight of the catalyst,
from 0.001 to 2% by weight of silicon,
from 0.1 to 15% by weight of at least one halogen chosen from among the group formed by fluorine, chlorine, bromine and iodine,
from 0.01 to 2% by weight of at least one noble metal of the platinum group,
from 0.005 to 10% by weight of at least one promoter metal chosen from the group formed by tin, germanium, indium, gallium, thallium, antimony, lead, rhenium, manganese, chromium, molybdenum and tungsten, said catalyst having undergone a complementary hydrothermal treatment, at a temperature from 300 to 1000° C., in a gaseous atmosphere containing steam.

DETAILED DESCRIPTION OF THE INVENTION

In one embodiment of the invention, the catalyst comprises in addition from 0.001 to 10% by weight of at least one doping metal chosen from the group constituted of the alkali and alkaline-earth metals, the lanthanides, titanium, zirconium, hafnium, cobalt, nickel and zinc.

It is to be noted that in the continuation of this text all the contents of silicon, halogen, noble metal, promoter metal and doping metal are expressed in % by weight compared to the total weight of the catalyst, unless indicated to the contrary. Moreover, these content levels correspond to the total content of constituent (doping metal, halogen, noble metal or promoter metal) when the constituent comprises several elements (halogens or metals).

In the invention, the application of a complementary hydrothermal treatment of the catalyst is very important. In fact, in the catalysts of the invention, it has been noted that the presence of silicon preserves the matrix in alumina(s) of the catalyst from a loss of specific surface area when it is submitted to the regeneration treatments necessary for its operation in conversion reactions of hydrocarbons, but the catalyst with silicon has the disadvantage of producing a high degree of cracking. In unexpected fashion, the applicant has noted that severe complementary hydrothermal treatment in the presence of water applied to this type of catalyst has the effect of preserving the loss of specific surface area, while also improving catalytic performance (less cracking).

Preferably, this complementary hydrothermal treatment is carried out in a gaseous atmosphere containing not only steam but also a halogen such as chlorine.

A preferred catalyst of the invention comprises:
a support constituted of a matrix of $\gamma$ alumina, of $\eta$ alumina or of a mixture of $\gamma$ alumina and $\eta$ alumina plus silicon.

at least one halogen,
a catalytic metal ensuring the function of dehydrogenation of the catalyst, constituted of one or several noble metals of the platinum group, and
at least one promoter metal chosen from among the metals cited above.

In the invention the matrix is a base of a hydrated oxide of aluminium. It is known that supports in alumina of the general formula $Al_2O_3-nH_2O$, where n is from 0 to 0.6, which present a specific surface area of 150 to 400 m²/gm, can be obtained by controlled dehydration of amorphous aluminium hydroxides where n has a value of between 1 and 3. The original amorphous hydroxides can exist under several forms and the most common are boehmite (n=1) gibbsite and bayerite (n=3), and they can lead during dehydration treatment to several transition oxides or aluminas such as the forms $\rho$, $\gamma$, $\eta$, $\chi$, $\theta$, $\delta$, $\kappa$, and $\alpha$ which are differentiated essentially by the organization of their crystalline structure. During thermal treatments, these different forms are susceptible to evolution between themselves, following a complex relationship which depends on the operating conditions of the treatment. The $\alpha$ form which presents a specific surface area and acidity which are nearly zero, is the most stable at high temperatures. For reforming catalysts, the $\gamma$ form of transition alumina is used most often, because of the compromise it offers between its properties of acidity and thermal stability.

In the invention, $\gamma$ transition alumina or $\eta$ transition alumina is used, or preferably a mixture of $\gamma$ transition alumina and $\eta$ transition alumina.

$\eta$ transition alumina can be obtained by roasting bayerite in dry air, at atmospheric pressure, between 250 and 500° C., preferably between 300 and 450° C. The specific surface area achieved which depends on the final temperature of roasting, is between 300 and 500 m²/gm. The $\gamma$ alumina comes from boehmite through roasting under air at a temperature between 450 and 600° C. The specific surface area of the $\gamma$ alumina obtained is between 100 and 300 m²/gm.

These two transition aluminas have crystalline structures which are close but distinctive. The technique of X-ray diffraction can, in particular, differentiate between them. Their structures are of the spinel type with faults, and their networks are slightly distant from cubic symmetry. This quadratic deformation is minimal for the $\eta$ form and is much clearer for $\gamma$ alumina whose unit-cell parameters are as follows: a=b=7.95 Å and c=7.79 Å.

According to the invention, when a mixture of $\gamma$ transition alumina and $\eta$ transition alumina is used, this can comprise from 0.1 to 99% or rather from 1 to 84% by weight of $\eta$ alumina. Preferably, this mixture comprises 3 to 70% by weight, and even better 5 to 50% by weight of $\eta$ transition alumina, the complement to reach 100% by weight of the mixture being $\gamma$ transition alumina.

According to the invention, the alumina matrix is modified by silicon.

The content of silicon of the catalyst is between 0.001 to 2% by weight, preferably 0.01 to 1% by weight.

The halogen or halogens used to acidify the support can represent a total of 0.1 to 15% by weight, and preferably 0.2 to 10% by weight. Preferably, a single halogen is used, in particular chlorine.

The catalyst also comprises one or several promoter metals which have the effect of promoting the dehydrogenation activity of the noble metal of the platinum group and of limiting the dispersion loss of the atoms of the noble metal from the support surface, which is partly responsible for the deactivation of the catalyst.

The total content of promoter metals is 0.005 to 10% by weight, preferably 0.01 to 1% by weight.

The promoter metals are chosen in function of the method of utilization of the catalyst.

Thus, when the catalyst is to be used in a fixed bed process, the promoter metal is chosen preferably from the group constituted by rhenium, manganese, chromium, molybdenum, tungsten, indium and thallium.

When the catalyst is to be used in a mobile bed process, the promoter metal is chosen preferably from the group constituted by tin, germanium, indium, antimony, lead, thallium and gallium.

Among these, rhenium-is preferred for fixed bed processes and tin for mobile bed processes, since they produce the best promoter effects on the activity of the catalyst.

In particular, rhenium increases the stability of the catalyst vis-à-vis its deactivation by coke deposits. Thus, preferably, rhenium is used in catalysts for fixed bed units since this added stability makes it possible to lengthen the reactive cycles between two catalyst regenerations.

As far as tin is concerned, this makes it possible to improve the performance of catalysts when they are used at low pressure. This improvement together with the lower cracking activity of catalysts using tin permits improved yields of reformed products, above all in continuous regeneration processes on mobile beds functioning at low operating pressure.

The total promoter metal(s) content is from 0.005 to 10% by weight, preferably 0.01 to 1% by weight.

When the catalyst only contains a single promoter metal, for example rhenium or tin, it is preferably present at 0.005 to 0.9% by weight or, even better, at 0.01 to 0.8% by weight.

The catalyst according to the invention comprises as well at least one noble metal of the platinum group, at 0.01 to 2% by weight, and preferably 0.1 to 0.8% by weight.

The noble metals which can be used are platinum, palladium, iridium; platinum is to be preferred.

According to one embodiment of the invention, the catalyst comprises in addition 0.001 to 10% by weight of at least one doping metal chosen from the group constituted by the alkali and alkaline-earth metals, lanthanides, titanium, zirconium, hafnium, cobalt, nickel and zinc.

In this case, the alumina matrix is modified with silicon and one or several doping metals.

Preferably, the doping metals belong to just one of the following groups:

1) the group of alkali and alkaline-earth metals,
2) the group of lanthanides, and
3) the group comprising titanium, zirconium, hafnium, cobalt, nickel and zinc.

In the case of metals belonging to the first group (alkali and alkaline-earth metals) the total content of doping metal of the catalyst is generally 0.001 to 8% by weight.

The alkaline metals used can be lithium, sodium, potassium, rubidium and caesium; the alkaline-earth metals can be chosen from among beryllium, magnesium, calcium, strontium and barium.

The content of doping metal of the first group is chosen in particular depending on the reactor in which the catalyst of the invention will be used.

Thus, in the case of a fixed bed reactor, the content of doping metal of the catalyst is generally within the range of 0.001 to 0.3%, and preferably between 0.005 and 0.3% or even better 0.01 and 0.3% by weight.

In the case of a mobile bed reactor, the content of doping metal of the catalyst is higher, generally from more than 0.3 to 8%, preferably more than 0.3 to 4% and even better 0.7 to 4% by weight.

Preferably, the doping metal is an alkaline metal such as potassium.

In the case of doping metals belonging to the second group (lanthanides), the total content of doping metal of the catalyst can be from 0.001 to 10% by weight.

The group of lanthanides or rare earths is comprised of the elements of the lanthanum group in the Mendeleev periodic table and whose atomic numbers are between 57 and 71, for example lanthanum, cerium, neodymium and praseodymium.

The total content of doping metal of the second group is also chosen in particular depending on the reactor in which the catalyst will be used.

Thus, it can be preferably between 0.001 to 0.5% and even better 0.01 to 0.5% by weight when the catalyst is used in a fixed bed process. Preferably, it is from more than 0.5 to 10%, or even better from more than 0.5 to 4% by weight when the catalyst is used in a mobile bed process.

In the case of doping metals belonging to the third group (Ti, Zr, Hf, Co, Ni, Zn), the total content of doping metal of the catalyst can be from 0.001 to 10% by weight.

It can also be chosen in function of the reactor in which the catalyst is to be used.

Thus, the total content of doping metal of the third group is, preferably, from 0.001 to 0.7% and even better from 0.01 to 0.7% by weight when the catalyst is used in a fixed bed process. Preferably, it is more than 0.7 to 10% and even better more than 0.7 to 4% by weight when the catalyst is used in a mobile bed process.

The catalyst of the invention can be prepared by depositing its different constituents on the alumina matrix. The deposit of each constituent can be carried out totally or partially on one or both of the two aluminas of the matrix before or after it is formed. The constituents can be deposited separately or simultaneously in any order whatsoever.

Thus, when a mixture of aluminas is used as matrix, the constituents of the catalyst can be deposited simultaneously on the two aluminas or on one of them, preferably on the η alumina before carrying out the mixture of the two aluminas and forming them.

It is also possible to carry out a partial or total deposit of one or certain constituents on the two aluminas or one of them before mixing them, and then carry out the other deposits after mixing of the two aluminas, either before or after the forming of the mixture. When one deposits one or several constituents before mixing the two aluminas, it is preferable to carry out the deposit of silicon on the η transition alumina.

Nonetheless, according to the invention, it is generally preferable to mix the two aluminas before depositing the metallic constituents and the halogen or halogens.

The invention also concerns a process for preparing the catalyst of the invention, which comprises the following stages:

a) preparation if required by mixing and then by forming of a matrix in γ transition alumina, in η transition alumina, or in a mixture of η transition alumina and γ transition alumina.

b) deposit on at least one of the γ and η transition aluminas of one of the following constituents, in the weight percentages given below, which refer to the total weight of the catalyst;

from 0.001 to 2% by weight, preferably from 0.01 to 1% by weight, of silicon, from 0.1 to 15%, preferably 0.2 to 10% by weight of at least one halogen chosen from the group constituted by fluorine, chlorine, bromine and iodine, from 0.01 to 2% of at least one noble metal of the platinum group, and from 0.005 to 10% by weight of at least one promoter metal chosen from the group constituted by tin, germanium, indium, gallium, thallium, antimony, lead, rhenium, manganese, chromium, molybdenum and tungsten, from 0.001 to 10% by weight if required of at least one doping metal chosen from the group constituted by the alkali and alkaline-earth metals, lanthanides, titanium, zirconium, hafnium, cobalt, nickel and zinc.

Stages a) and b) can be carried out in any order whatsoever and the deposits of stage b) can be only partly carried out before stage a) and can be carried out in any order whatsoever; and c) complementary hydrothermal treatment of the catalyst obtained after stages a) and b), at a temperature between 300 and 1000° C., in a gaseous atmosphere containing steam.

In a preferred embodiment of this process, first of all a support is prepared formed from the matrix of alumina and silicon, and then one deposits on this the doping metal or metals, the promoter metal or metals, the halogen or halogens, and the noble metal or metals of the platinum group.

In this case, silicon can be deposited on the alumina or the mixture of aluminas, before or after forming.

Preferably, the silicon is deposited after the forming of the alumina matrix.

The deposit of the different constituents of the catalyst can be carried out by classical techniques, in liquid or gaseous phase, starting from the appropriate precursor components. When the deposit is made on the alumina matrix which is already formed, the techniques employed can for example be dry impregnation, impregnation through excess solution or ionic exchange. This operation is followed if necessary by drying and roasting at a temperature between 300 and 900° C., preferably in the presence of oxygen.

Thus, the silicon can be deposited from components such as the alkyl tetraorthosilicates, the silicon alkoxides, the quaternary ammonium silicates, the silanes, the disilanes, the silicones, the siloxanes, the silicon halides, the halogenosilicates and silicon in the form of micro-balls of colloidal silica. In the case where the precursor of silicon is a fluorosilicate, this can be expressed by the formula $M_{2/x}SiF_6$, where M is a metallic or non-metallic cation with valency x, chosen from among the following cations: $NH_4^+$, ammonium alkyls, $K^+$, $Na^+$, $Li^+$, $Ba^{2+}$, $Mg^{2+}$, $Cd^{2+}$, $Cu^+$, $Cu^{2+}$, $Ca^{2+}$, $Cs^+$, $Fe^{2+}$, $Co^{2+}$, $Pb^{2+}$, $Mn^{2+}$, $Rb^+$, $Ag^+$, $Sr^{2+}$, $Zn^{2+}$, $Tl^+$ and $H^+$.

When the silicon is deposited after the forming of the alumina matrix, this deposit is preferably carried out by impregnation in a water medium by using an excess of aqueous solution of the precursor. Then the impregnation solvent is eliminated, for example by drying and air roasting is carried out, at a temperature for example between 300 and 900° C.

The deposit of the doping metal or metals of the first group chosen from among the alkali and alkaline-earth metals can be carried out by any technique whatsoever and can take place at any stage of the preparation process of the catalyst. When this deposit is made after the forming of the matrix of alumina, it is preferable to use impregnation in an aqueous medium by excess of solution, followed by drying to eliminate the impregnation solvent and roasting in air at a temperature between for example 300 and 900° C.

The precursor components used can be for example salts of the alkali and alkaline-earth metals such as halides, nitrates, carbonates, acetates, sulphates, cyanides and oxalates.

The deposit of doping metal or metals of the second group (lanthanides) can be carried out using any technique known to the state of the art, and can take place at any moment of the preparation of the catalyst. For example, in the case where this element of the group of the lanthanides or rare earths is deposited after the forming of the alumina or aluminas containing other metals if required, one can use dry impregnation, impregnation through excess of solution or ionic exchange. On a matrix which has already been formed, a preferred method for the introduction of this additional element is impregnation in an aqueous medium by using an excess of solution. In order to eliminate the impregnation solvent, this impregnation is followed by drying and roasting in air at a temperature between, for example, 300 and 900° C.

The precursor components can be, for example, halides, nitrates, carbonates, acetates, sulphates or oxalates of said elements.

The deposit of doping metal or metals of the third group constituted by titanium, zirconium, hafnium, cobalt, nickel and zinc on the matrix of the catalyst used in the present invention, can be carried out according to all the state of the art techniques, and can occur at any moment during the preparation of the catalyst. For example, in the case where this element is deposited after the forming of the alumina or aluminas containing if required other metals, one can use dry impregnation, impregnation through excess solution, or ionic exchange. On a matrix which is already formed, a preferred method for introducing this additional element is impregnation in an aqueous medium by using an excess of solution. In order to eliminate the impregnation solvent, this impregnation is followed by drying and roasting in air at a temperature of between, for example, 300 and 900° C.

The deposits of silicon and at least one element chosen from the group constituted by titanium, zirconium, hafnium, cobalt, nickel and zinc can be carried out independently from each other, either on a transition alumina or on the non-formed matrix, said matrix comprising between 0 and 99% by weight of η transition alumina and the complement up to 100% of γ transition alumina, or yet again on the preformed matrix, the latter being the preferred method.

The deposit of a noble metal or metals of the platinum group can also be carried out by classical techniques, in particular impregnation from an aqueous solution or not containing a salt or compound of the noble metal. As an example of salts or compounds which can be used, one can cite chloroplatinic acid, ammoniated compounds, ammonium chloroplatinate, platinum dicarbonyl dichloride, hexahydroxyplatinic acid, palladium chloride and palladium nitrate.

In the case of platinum, the ammoniated compounds can for example be the salts of platinum IV hexamines of formula $Pt(NH_3)_6X_4$, the salts of platinum IV halogenopentamines of formula $(PtX(NH_3)_5)X_3$, the salts of platinum tetrahalogenodiamines of formula $PtX_4(NH_3)_2X$, the complexes of platinum with halogens-polyketones and the halogen compounds of formula $H(Pt(aca)_2X)$ in which the element X is a halogen chosen from the group comprising chorine, fluorine, bromine and iodine, and preferably chlorine, and the group aca represents the rest of the formula $C_5H_7O_2$ derived from acetylacetone. The introduction of the noble metal of the platinum group is preferably carried out by impregnation with the aid of an aqueous or organic solution of one of the organometallic compounds cited above. Among the organic solvents which can be used, one can cite the paraffinic, naphthenic or aromatic hydrocarbons, and the organic halogen compounds with for example 1 to 12 carbon atoms per molecule. One can cite for example n-heptane, methylcyclohexane, toluene and chloroform. Mixtures of solvents can also be used.

After introduction of the noble metal, drying and roasting is preferably carried out, for example at a temperature of between 400 and 700° C.

The deposit of a noble metal or noble metals of the platinum group can occur at any moment during the preparation of the catalyst. It can be carried out in isolation or simultaneously with the deposit of other constituents, for example the promoter metal or metals. In the latter case, for impregnation, a solution can be used containing all the constituents to be introduced simultaneously.

The deposit of the promoter metal or metals can also be carried out by classical techniques beginning from precursor compounds such as the halogens, nitrates, acetates, tartrates, citrates, carbonates and the oxalates of these metals. Any other salt or oxide of these metals which is soluble in water, acids, or in another appropriate solvent, is also suitable as a precursor. As examples of such precursors, one can cite the rhenates, chromates, molybdates and tungstates. One can also introduce the promoter metal or metals through mixture of an aqueous solution of their precursor compound(s) with the alumina or aluminas before forming, followed by roasting in air at a temperature between 400 and 900° C.

The introduction of the promoter metal or metals can also be carried out with the aid of a solution of an organometallic compound of said metals in an organic solvent. In this case, this deposit is made preferably after that of the noble metal(s) of the platinum group and roasting of the solid, followed if required by reduction with hydrogen at high temperature, for example between 300 and 500° C. The organometallic compounds are chosen in the group constituted by the complexes of said promoter metal, in particular the polyketone complexes and the hydrocarbylmetals such as the alkyl, cycloalkyl, aryl, alkylaryl and arylalkyl metals. Organohalogen compounds can also be used. One can cite in particular tin tetrabutyl in the case where the promoter metal is tin, lead tetraethyl in the case where the promoter metal is lead and indium triphenyl in the case where the promoter metal is indium. The impregnation solvent can be chosen from the group constituted by the paraffinic, naphthenic or aromatic hydrocarbons containing from 6 to 12 carbon atoms per molecule and the halogen organic compounds containing 1 to 12 atoms of carbon per molecule. One can cite for example, n-heptane, methylcyclohexane and chloroform. Mixtures of the solvents defined above can also be used.

The halogen, for example chlorine, can be introduced into the catalyst at the same time as another metallic constituent, for example in the cases where a halide is used as precursor compound of the metal of the platinum group, of the promoter metal or of the alkali or alkaline-earth metal. This introduction can also be carried out through impregnation of the support by means of an aqueous solution containing an acid or a halided salt. For example, chlorine can be deposited by using a solution of hydrochloric acid. Chlorine can also be introduced by roasting of the catalyst at a temperature between for example 400 and 900° C., in the presence of an organic compound containing the halogen, such as for example $CCl_4$, $CH_2Cl_2$ and $CH_3Cl$.

Of course, at least two constituents of the catalyst can be introduced simultaneously, for example beginning from a solution containing their precursor compounds. The constituents can also be introduced successively in any order whatsoever, from separate solutions. In this latter case, one can proceed with intermediary drying and/or roasting.

The formation of the alumina matrix can be carried out using state of the art techniques for formation of catalysts such as, for example, extrusion, drip coagulation, coating, drying by atomization or pelletizing.

In the preferred embodiment, the preparation process is characterized in that it comprises the following successive stages:

a) formation of the matrix of γ alumina or η alumina or of a mixture of γ alumina and η alumina, b) deposit of silicon on this matrix, c) possible deposit of at least one doping metal, and d) simultaneous or successive deposit of at least one promoter metal chosen from among tin, germanium, indium, gallium, thallium, antimony, lead, rhenium, manganese, chromium, molybdenum and tungsten;

of at least one element chosen from the group constituted by fluorine, chlorine, bromine, iodine, and of at least one noble metal of the platinum group.

After formation of the matrix and deposit of all the constituents, one can proceed to a final thermal treatment between 300 and 1000° C., which can comprise only a single stage preferably at a temperature between 400 and 900° C., and in an atmosphere containing oxygen, preferably in the presence of free oxygen or air. This treatment generally corresponds to drying-roasting following the deposit of the last constituent. After formation of the matrix and deposit of all the constituents, the complementary hydrothermal treatment is carried out, at a temperature between 300 and 1000° C. and preferably 400 to 700° C., in a gaseous atmosphere containing steam and if required a halogen such as chlorine.

This treatment can be carried out on a bed crossed by a current of gas or in a static atmosphere. Preferably, the gaseous atmosphere contains water and if required at least one halogen. The molar content in water is from 0.05 to 100%, preferably 1 to 50%. The molar content of halogen is 0 to 20%, and preferably between 0 and 10%, and preferably again between 0 and 2%. The length of time of this treatment is variable depending on the conditions of temperature, partial water pressure and quantity of catalyst. Advantageously this value is between one minute and 30 hours, preferably between 1 and 10 hours. The gaseous atmosphere used is for example based on air, oxygen, or an inert gas such as argon or nitrogen.

The role of this high-temperature treatment in the presence of water is important. As described in the examples given below, in the presence of silicon which preserves the matrix in alumina(s) from a loss of s specific surface area during the different regenerating treatments, in an unexpected fashion, severe thermal treatment in the presence of water applied to this type of catalyst has the effect of preserving it from a loss of specific surface area, while still improving the catalytic performance.

After the final thermal treatment, the catalyst can be submitted to an activation treatment under hydrogen at high temperature, for example at a temperature between 300 and 550° C.

The process for treatment under hydrogen consists for example of raising the temperature slowly in a current of hydrogen until the maximum reduction temperature is reached, generally between 300 and 550° C. and preferably between 350 and 450° C., followed by maintenance at this temperature for a period which generally lasts between 1 and 6 hours.

According to the invention, the catalyst described above is used for reactions for the conversion of hydrocarbons, and more particularly in the processes of reforming gasolines and production of aromatics.

The reforming processes make it possible to raise the octane number of the gasoline fractions from the distillation of crude oil and/or other refining processes.

The processes for production of aromatics provide the bases (benzene, toluene and xylene) which can be used in petrochemistry. These processes have a supplementary interest in that they contribute to the production of large quantities of hydrogen which is indispensable for the hydrotreatment processes of the refinery.

These two processes differ through the choice of operating conditions and the composition of the load.

The typical load treated by these processes contains paraffinic, naphthenic and aromatic hydrocarbons containing 5 to 12 atoms of carbon per molecule. This load is defined, among other things, by its density and its composition by weight.

In order to activate these processes, the hydrocarbon load is put into contact with the catalyst of the present invention under the appropriate conditions, for example at a temperature of 400 to 700° C., at a pressure ranging from atmospheric pressure to 4 Mpa, using either the mobile bed or fixed bed technique. When the fixed bed technique is used, the pressure is between 1 and 2 MPa, and when the mobile bed technique is used, the pressure is preferably from 0.1 to 0.9 MPa.

Generally contact is made with a mass debit of load treated per unit mass of catalyst and per hour between 0.1 and 10 kg/kg.hr.

A part of the hydrogen produced is recycled according to a molar recycling content of between 0.1 and 8. This content is the molar relation of the debit of hydrogen recycled over the mass flow of the load.

Other features and advantages of the invention will become clearer when reading the examples which follow, it being understood that the data given are illustrative and non-restrictive.

EXAMPLE 1

This example illustrates the production of a catalyst comprising a matrix formed of a mixture of $\gamma$ alumina and $\eta$ alumina, on which are deposited silicon, chlorine, tin and platinum.

a) Formation of the Matrix in Alumina

First of all the matrix is prepared in alumina by mixing a powder of $\gamma$ alumina of a specific surface area of 220 m$^2$/gm and a powder of $\eta$ alumina with a specific surface area equal to 320 m$^2$/gm which has been prepared by roasting bayerite. The proportion of $\eta$ alumina is 10% by weight. This mixture is then formed by extrusion, then roasted in a current of dry air at 520° C. for 3 hours.

b) Deposit of Silicon

After cooling down, silicon is deposited on the roasted matrix by putting it into contact with an ethanolic solution of tetraethyl orthosilicate (Si(OC$_2$H$_5$)$_4$. The concentration of this solution is 18.5 gm of silicon per liter. This contact is made at ambient temperature with stirring, for 2 hours. The solvent is then evaporated under reduced pressure. Then the impregnated extrusions are dried at 120° C. for 15 hours, and roasted at 530° C. in a current of dry air for 2 hours. One thus obtains a support conforming to the invention.

c) Deposit of Platinum, Tin and Chlorine

Next platinum, tin and chlorine are deposited simultaneously on the support by impregnation with an aqueous chlorinated solution containing per liter:

0.96 gm of tin under the form SnCl$_2$, and 0.81 gm of platinum under the form H$_2$PtCl$_6$.

The solution is left in contact with the support for 2 hours. After centrifugation and drying for 4 hours at 120° C., the impregnated support is roasted at 530° C. for 3 hours in a current of dry air.

d) Hydrothermal Treatment

A hydrothermal treatment is then carried out in the presence of water and chlorine. With this aim, the catalyst is treated at 510° C. for 2 hours in a current of 2000 dm$^3$/hr of air for 1 kg of solid product. This air contains water and chlorine injected in a preheating zone situated upstream from the bed of solid. The molar concentrations in water and chlorine are equal to 1% and 0.05% respectively.

The specifications of the catalyst obtained are given in table 1.

EXAMPLE 2

The same operating mode is followed as for example 1 in order to prepare a catalyst comprising the same constituents, apart from the fact that one does not carry out the hydrothermal treatment of stage d).

[ . . . ] The molar concentrations of water and chlorine are respectively 1% and 0.05%.

The characteristics of the catalyst obtained are given in Table 1.

EXAMPLE 2

The same operating method as in example 1 is used to prepare a catalyst having the same constituents, except that it does not include the hydrothermal treatment of stage d).

The characteristics of the catalyst obtained are also given in table 1.

Comparative Example 1

In this example, the same operating method as in example 1 is used, but during stage a) only $\gamma$ alumina is used, and silicon depositing stage a) and hydrothermal treatment stage d) are not carried out.

The characteristics of the catalyst obtained are also given in table 1.

TABLE 1

| Catalyst | proportion $\eta$ alumina (weight % of matrix) | Specific surface area (m$^2$/g) | Platinum content (weight %) | Tin content (weight %) | Chlorine content (weight %) | Silicon content (weight %) |
|---|---|---|---|---|---|---|
| Ex. 2 | 10 | 227 | 0.25 | 0.17 | 1.08 | 1.04 |
| Ex. 1 | 10 | 228 | 0.24 | 0.18 | 1.13 | 1.02 |
| Comparat. Ex. 1 | 0 | 219 | 0.23 | 0.18 | 1.15 | 0 |

EXAMPLE 3

In this example, the catalysts of examples 1 and 2 and of the comparative example are tested [ . . . ]

| content of naphthenes | 33.1% by weight |
|---|---|
| content of aromatics | 12.1% by weight |

The following operating conditions are used:

| | |
|---|---|
| temperature | 500° C. |
| total pressure | 1.0 Mpa |
| mass flow of the load | 1.8 kg/kg of catalyst |
| length of time | 100 hr. |

At the end of the functioning period, the deactivated catalyst is regenerated through controlled combustion of the coke and adjustment of its chlorine content to around 1.10% by weight. The specific surface area of the support is measured after this regeneration. Then after activation of the catalyst at high temperature by hydrogen, the load is injected for a new functioning period. Thus, each catalyst has been submitted to 5 cycles of operation-regeneration. The specific surface areas corresponding to the beginning of the first and last cycles and the performances obtained after 15 hours of operation for each of these two cycles are recorded in table 2 below.

TABLE 2

| Catalyst | Cycle | Specific surface area (m²/g) | Reformate yield (weight %) | Desired octane rating (weight %) | Aromatic yield (weight %) | C4 yield (weight %) |
|---|---|---|---|---|---|---|
| Example 2 | 1 | 227 | 91.2 | 97.4 | 67.7 | 5.2 |
| | 5 | 226 | 91.5 | 96.9 | 66.8 | 5.1 |
| Example 1 | 1 | 228 | 91.4 | 98.0 | 68.3 | 5.2 |
| | 5 | 225 | 91.9 | 97.2 | 67.2 | 4.3 |
| Comparat. Example 1 | 1 | 219 | 90.3 | 97.2 | 67.0 | 5.9 |
| | 5 | 197 | 91.7 | 94.8 | 64.8 | 5.1 |
| Example 2 | | | | | | |

If the performances of the catalysts in examples 1 and 2 are compared to those of the catalyst of the prior art (comparative example 1), it is found that the catalysts of examples 1 and 2 give the best yields in aromatics and the best reformate octane ratings. It is also found that these gains are achieved without affecting reformate yields.

If consideration is now given to the development over 5 cycles, it becomes apparent that the drop in specific surface areas of examples 1 and 2 is much lower than that of the catalyst in the prior art.

This smaller drop is concomitant with better maintained yields of aromatics and octane ratings.

With the catalysts of the invention it is therefore possible to obtain better octane ratings with unchanged reformate yields that are stable throughout several cycles. cycles, better octane numbers for unchanged yields of reformed product.

EXAMPLE 4

This example illustrates the production of a s catalyst comprising a matrix formed of a mixture of γ alumina and η alumina, on which are deposited silicon, chlorine, potassium, rhenium and platinum.

a) Formation of the Matrix in Alumina

First of all the alumina matrix is prepared by mechanical mixing of a powder of γ alumina of specific surface area of 220 m²/gm and a powder of η alumina of specific surface area equal to 320 m²/gm which has been prepared by roasting bayerite. The η alumina proportion is 30% by weight. This mixture is then formed by extrusion, and roasted in a current of dry air at 520° C. for 3 hours.

b) Deposit of Silicon

After cooling down, silicon is deposited on the roasted matrix by putting it into contact with an ethanolic solution of tetraethyl orthosilicate $Si(OC_2H_5)_4$. The concentration of this solution is 2.5 gm of silicon per liter. This contact is made at ambient temperature with stirring, for 2 hours. The solvent is then evaporated under reduced pressure. Then the impregnated extrusions are dried at 120° C. for 15 hours, and roasted at 530° C. in a current of dry air for 2 hours.

c) Potassium Deposit

Then the extrusions are put into contact with an aqueous solution of potassium carbonate $K_2CO_3$ containing 12.8 gm/l of potassium. This contact is carried out at ambient temperature for 1 hour, and then the impregnated matrix is dried at 120° C. over 15 hours and roasted at 530° C. in a current of dry air for 2 hours.

d) Deposit of Platinum and Chlorine

The platinum and part of the chlorine are then deposited simultaneously on this support through impregnation by a chlorinated aqueous solution containing per liter:

8.20 gm of chlorine in the form of HCl, and 1.00 gm of platinum in the form of $H_2PtCl_6$.

The solution is left in contact with the support for 2 hours. After centrifugation and drying for 4 hours at 120° C., the impregnated support is roasted at 530° C. for 3 hours in a current of dry air.

e) Deposit of Rhenium and Chlorine

Then the rhenium and the rest of the chlorine are deposited simultaneously through impregnation by a chlorinated aqueous solution containing per liter:

4.20 gm of chlorine in the form of HCl, and 1.50 gm of rhenium in the form of $ReCl_3$.

After drying, the impregnated support is roasted at 530° C. for 2 hours in a current of dry air.

f) Hydrothermal Treatment

A hydrothermal treatment is then carried out in the presence of water and chlorine. For this, the catalyst is treated at 510° C. for 2 hours in a current of air of 2000 dm³/hr for 1 kg of solid product. This air contains water and chlorine injected in a preheating zone situated upstream from the bed of solid. The molar concentrations in water and chlorine are equal to 1% and 0.05% respectively.

The specifications of the catalyst obtained are given in table 3.

EXAMPLE 5

The same operating mode is followed as in example 4 to prepare a catalyst comprising the same constituents, apart from the fact that in stage c), the impregnation solution contains 6.4 gm/l of potassium, and the hydrothermal treatment of stage e) is not carried out.

The specifications of the catalyst obtained are also given in table 3.

Comparative Example 2

In this example, the same operating mode as in example 4 is followed, but in stage a) only γ alumina is used, and stages b) and c) for depositing silicon and potassium and stage f) for hydrothermal treatment are not applied.

The specifications of the catalyst obtained are also given in table 3.

EXAMPLE 6

This example illustrates the production of a catalyst comprising a matrix formed from a mixture of γ alumina and η alumina comprising 8% η alumina, on which are deposited silicon, chlorine, potassium, tin and platinum.

For this preparation, the same operating mode as in example 4 is followed, utilizing in stage a) 8% by weight of η alumina and instead of stages d) and e) carrying out a single simultaneous deposit stage of platinum, tin and chlorine through impregnation with a chlorinated aqueous solution containing per liter:

0.81 gm of platinum in the form $H_2PtCl_6$, and
0.96 gm of tin in the form $SnCl_2$.

The solution is left in contact with the support for 2 hours. After centrifugation and drying for 4 hours at 120° C., the impregnated support is roasted at 530° C. for 3 hours in a current of dry air.

A hydrothermal treatment is then carried out in the presence of water and chlorine as in stage f) of example 4.

The specifications of the catalyst obtained are given in table 3.

EXAMPLE 7

The same operating mode as in example 6 is then followed to prepare a catalyst comprising the same constituents, apart from the fact that in stage c), the impregnation solution contains 6.4 gm/l of potassium, and the final hydrothermal treatment in the presence of water and chlorine is not carried out.

The specifications of the catalyst obtained are also given in table 3.

Comparative Example 3

In this example, the same operating mode as in example 6 is followed but in stage a) only γ alumina is used, and stages b) and c) for depositing silicon and potassium and the last stage f) for hydrothermal treatment in the presence of water and chlorine as described in example 1 are not applied.

The specifications of the catalyst obtained are also given in table 3.

EXAMPLE 8

In this example, the catalysts of examples 4 and 5 and the comparative example 2 are tested, for conversion of a load of hydrocarbons with the following specifications:

| | |
|---|---|
| volume mass at 20° C. | 0.742 kg/dm³ |
| octane number required | ~41 |
| content of paraffins | 52.2% by weight |
| content of naphthenes | 32.4% by weight |
| content of aromatics | 15.4% by weight |

The following operating conditions are used:

| | |
|---|---|
| temperature | 500° C. |
| total pressure | 1.5 Mpa |
| mass flow of the load | 2.0 kg/kg of catalyst and per hr. |
| length of time | 100 hr. |

The performances of the catalysts are recorded in table 4 below, and are expressed in yields by weight and of the octane number required of the reformed product.

TABLE 4

| Catalyst | Reformate yield (weight %) | Hydrogen yield (weight %) | Aromatics yield (weight %) | C4 yield (weight %) | C4/aromatics |
|---|---|---|---|---|---|
| Example 4 | 85.1 | 3.2 | 60.2 | 11.7 | 0.19 |
| Example 5 | 84.7 | 3.3 | 60.8 | 12.0 | 0.20 |
| Comparative example 2 | 83.9 | 3.0 | 60.0 | 13.1 | 0.22 |

If a comparison is made between the performances of the catalysts of example 4 and the comparative example 2 on the one hand, and those of the catalysts of example 5 and of the comparative example 2 on the other, it is noted that the catalysts of examples 4 and 5 have performances which are a clear improvement over the prior art catalyst (comparative example 2).

TABLE 3

| Catalyst | Proportion η alumina (weight of matrix) | Specific surface area (m²/gm) | Platinum content (weight %) | Tin content (weight %) | Rhenium content (weight %) | Chlorine content (weight %) | Silicon content (weight %) | Potassium content (weight %) |
|---|---|---|---|---|---|---|---|---|
| Example 4 | 30 | 237 | 0.25 | 0 | 0.47 | 1.17 | 0.045 | 0.23 |
| Example 5 | 30 | 238 | 0.24 | 0 | 0.50 | 1.07 | 0.045 | 0.12 |
| Compar Example 2 | 0 | 216 | 0.23 | 0 | 0.48 | 1.12 | 0 | 0 |
| Example 6 | 8 | 227 | 0.22 | 0.18 | 0 | 1.14 | 0.13 | 0.76 |
| Example 7 | 8 | 225 | 0.25 | 0.16 | 0 | 1.06 | 0.15 | 0.34 |
| Compar. Example 3 | 0 | 219 | 0.23 | 0.18 | 0 | 1.15 | 0 | 0 |

In fact, the yields of light cracking products C4 obtained during the test of the two catalysts of examples 4 and 5 are very significantly lower than those observed for the catalyst of the comparative example 2.

Thus, it can be seen that the relation between the yields of cracking products C4 and the yields of aromatic compounds, called C4-/aromatics in the table above, is lower for the two catalysts according to the invention. The selectivity of the catalysts vis-à-vis the aromatic products required become higher as this relation becomes lower.

The catalysts of examples 4 and 5 containing, in addition compared to the catalyst of example 2, η alumina, silicon and potassium, present improved specifications relative to the catalyst of comparative example 2, notably as far as weaker selectivity of cracking products is concerned, and thus improved selectivity for aromatic products.

EXAMPLE 9

In this example, the catalysts of examples 6 and 7 and the comparative example 3, are tested for conversion of a load of hydrocarbons with the following specifications:

| | |
|---|---|
| volume mass at 20° C. | 0.736 kg/dm$^3$ |
| octane number required | ~38 |
| content of paraffins | 54.8% by weight |
| content of naphthenes | 33.1% by weight |
| content of aromatics | 12.1% by weight |

The following operating conditions are used:

| | |
|---|---|
| temperature | 495° C. |
| total pressure | 0.75 Mpa |
| mass flow of the load | 1.8 kg/kg of catalyst |
| length of time | 100 hr. |

At the end of the functioning period, the deactivated catalyst is regenerated through controlled combustion of the coke and adjustment of its chlorine content to around 1.10% by weight. The specific surface area of the support is measured after this regeneration. Then after activation of the catalyst at high temperature by hydrogen, the load is injected for a new functioning period. Thus, each catalyst has been submitted to 5 cycles of operation-regeneration. The specific surface areas corresponding to the beginning of the first and last cycles and the performance obtained after 15 hours of operation for each of these two cycles are recorded in table 5 below.

TABLE 5

| Catalyst | cycle | Specific surface area (m$^2$/gm) | Reformate yield (weight %) | Octane number required | Aromatics yield (weight %) | C4 yield (weight %) |
|---|---|---|---|---|---|---|
| Example 6 | 1 | 227 | 91.2 | 97.9 | 68.2 | 5.5 |
| | 5 | 220 | 92.1 | 96.8 | 67.3 | 4.7 |
| Example 7 | 1 | 225 | 91.2 | 97.6 | 67.9 | 5.4 |
| | 5 | 213 | 91.5 | 96.5 | 66.5 | 5.3 |
| Comparative Example 3 | 1 | 219 | 90.7 | 97.5 | 67.2 | 6.0 |
| | 5 | 198 | 91.6 | 95.4 | 65.1 | 5.2 |

If a comparison is made between the performances of the catalysts of examples 6 and 7, with those of the prior art catalyst (comparative example 3), it can be seen that the catalysts of examples 6 and 7 present better yields in aromatics and better octane numbers for the reformed product. It can also be noted that these improvements are achieved without the reformed product yields being affected.

If the evolution over 5 cycles is now considered, it can be seen that the fall in the specific surface areas of examples 6 and 7 is much less than that of the prior art catalyst. This smaller fall is accompanied by better maintenance of yields in aromatics and octane numbers.

EXAMPLE 10

This example illustrates the production of a catalyst comprising a matrix formed of a mixture of γ alumina and η alumina, on which are deposited silicon, chlorine, lanthanum, rhenium and platinum.

a) Formation of the Matrix in Alumina

First of all the alumina matrix is prepared by mechanical mixing of a powder of γ alumina of specific surface area 220 m$^2$/gm and a powder of η alumina of specific surface area equal to 320 m$^2$/gm which has been prepared by roasting bayerite. The proportion of η alumina is 40% by weight. This mixture is then formed by extrusion, and then roasted in a current of dry air at 520° C. for 3 hours.

b) Deposit of Silicon

After cooling down, silicon is deposited on the roasted matrix by putting it into contact with an ethanolic solution of tetraethyl orthosilicate $Si(OC_2H_5)_4$. The concentration of this solution is 2.5 gm of silicon per liter. This contact is made at ambient temperature with stirring, for 2 hours. The solvent is then evaporated under reduced pressure. Then the impregnated extrusions are dried at 120° C. for 15 hours, and roasted at 530° C. in a current of dry air for 2 hours.

c) Lanthanum Deposit

Then the extrusions are put into contact with an aqueous solution of lanthanum nitrate $La(NO_3)_3, 6H_2O$ containing 42 gm/l of lanthanum. This contact is carried out at ambient temperature for 2 hours, and then the impregnated matrix is dried at 120° C. for 15 hours and roasted at 530° C. in a current of dry air for 2 hours.

d) Deposit of Platinum and Chlorine

Then the platinum and part of the chlorine are deposited simultaneously on this support through impregnation by a chlorinated aqueous solution containing per liter.

8.20 gm of chlorine in the form of HCl, and 1.00 gm of platinum in the form of $H_2PtCl_6$.

The solution is left in contact with the support for 2 hours. After centrifugation and drying for 4 hours at 120° C., the impregnated support is roasted at 530° C. for 3 hours in a current of dry air.

e) Deposit of Rhenium and Chlorine

Then the rhenium and the rest of the chlorine are deposited simultaneously through impregnation by a chlorinated aqueous solution containing per liter:

4.20 gm of chlorine in the form of HCl, and 1.50 gm of rhenium in the form of $ReCl_3$.

After drying, the impregnated support is roasted at 530° C. for 2 hours in a current of dry air.

f) Hydrothermal Treatment

A hydrothermal treatment is then carried out in the presence of water and chlorine. For this, the catalyst is treated at 510° C. for 2 hours in a current of air of 2000 dm$^3$/hr for 1 kg of solid product. This air contains water and chlorine injected in a preheating zone situated upstream from the bed of solid. The molar concentrations in water and chlorine are equal to 1% and 0.05% respectively.

The specifications of the catalyst obtained are given in table 6.

EXAMPLE 11

The same operating mode is followed as for example 10 to prepare a catalyst comprising the same constituents, except that in stage c), the impregnation solution contains 21 gm/l of lanthanum, and the hydrothermal-treatment of stage f) is not applied.

The specifications of the catalyst obtained are also given in table 6.

EXAMPLE 12

This example illustrates the production of a catalyst comprising a matrix formed of γ alumina, on which are deposited silicon, chlorine, lanthanum, rhenium and platinum.

For this preparation, the same operating mode as for example 10 is followed, but stage f) is not applied. In stage a) only γ alumina is used and stage b) is carried out in the same conditions as those of example 10, except for the concentration in silicon of the solution, which is 3.2 gm/l. Stages c), d) and e), are carried out as in example 10.

The specifications of the catalyst obtained are given in table 6.

EXAMPLE 13

The same operating mode as for example 12 is followed to prepare a catalyst comprising the same constituents, but one additional hydrothermal treatment is applied in the same conditions as those in example 10 (stage f)

The chlorine content of the catalyst is 1.08% by weight.

Comparative Example 4

In this example, the same operating mode as for example 10 is followed, but in stage a) only γ alumina is used and stages b) and c) for depositing silicon and lanthanum and stage f) for hydrothermal treatment are not applied.

The specifications of the catalyst obtained are also given in table 6.

EXAMPLE 14

This example illustrates the production of a catalyst comprising a matrix formed from a mixture of γ alumina and η alumina comprising 12% η alumina, on which are deposited silicon, chlorine, lanthanum, tin and platinum.

For this preparation, the same operating mode as in example 10 is followed, utilizing in stage a) 12% by weight of η alumina and instead of stages d) and e) carrying out a single simultaneous deposit stage of platinum, tin and chlorine through impregnation with a chlorinated aqueous solution containing per liter:

0.81 gm of platinum in the form $H_2PtCl_6$, and 0.969 gm of tin in the form $SnCl_2$.

The solution is left in contact with the support for 2 hours. After centrifugation and drying for 4 hours at 120° C., the impregnated support is roasted at 530° C. for 3 hours in a current of dry air.

A hydrothermal treatment is then carried out in the presence of water and chlorine as in stage f) of example 10, but operating at 500° C. with molar concentrations in water and chlorine respectively of 1.5% and 0.02%.

The specifications of the catalyst obtained are given in table 6.

EXAMPLE 15

The same operating mode as in example 14 is followed to prepare a catalyst comprising the same constituents, apart from the fact that in stage c), the impregnation solution contains 21 gm/l of lanthanum, and the final hydrothermal treatment of stage f) in the presence of water and chlorine is not carried out.

The specifications of the catalyst obtained are also given in table 6.

Comparative Example 5

In this example, the same operating mode as in example 14 is followed but in stage a) only γ alumina is used and one stages b) and c) for depositing silicon and lanthanum and the last stage f) for hydrothermal treatment in the presence of water and chlorine of example 14 are not used.

The specifications of the catalyst obtained are given in table 6.

TABLE 6

| Catalyst | Proportion η alumina (% weight of matrix) | Specific surface area (m²/gm) | Platinum content (weight %) | Tin content (weight %) | Rhenium content (weight %) | Chlorine content (weight %) | Silicon content (weight %) | Lanthanum content (weight %) |
|---|---|---|---|---|---|---|---|---|
| Example 10 | 40 | | 0.23 | 0 | 0.24 | 1.18 | 0.028 | 0.47 |
| Example 11 | 40 | | 0.22 | 0 | 0.24 | 1.09 | 0.028 | 0.11 |
| Example 12 | 0 | | 0.24 | | 0.23 | 1.05 | 0.035 | 0.43 |
| Compar. Example 4 | 0 | | 0.23 | 0 | 0.25 | 1.12 | 0 | 0 |
| Example 14 | 12 | 229 | 0.24 | 0.16 | 0 | 1.13 | 0.11 | 1.70 |
| Example 15 | 12 | 231 | 0.24 | 0.16 | 0 | 1.08 | 0.13 | 0.82 |
| Compar. Example 5 | 0 | 219 | 0.25 | 0.18 | 0 | 1.15 | 0 | 0 |

EXAMPLE 16

In this example, the catalysts of examples 10 and 13 and the comparative example 4 are tested, for conversion of a load of hydrocarbons with the following specifications:

| | |
|---|---|
| volume mass at 20° C. | 0.742 kg/dm³ |
| octane number required | ~41 |
| content of paraffins | 52.2% by weight |
| content of naphthenes | 32.4% by weight |
| content of aromatics | 15.4% by weight |

The following operating conditions are used:

| | |
|---|---|
| temperature | 490° C. |
| total pressure | 1.4 Mpa |
| mass flow of the load by mass | 3.0 kg/kg of catalyst and per hr. |

The performances of the catalysts are recorded in table 7 below, and are expressed in yields by weight and of the octane number required of the reformed product.

TABLE 7

| Catalyst | Reformate yield (% by weight) | Hydrogen yield (% by weight) | Aromatics yield (% by weight) | C4 yield (% by weight) | C4 aromatics |
|---|---|---|---|---|---|
| Example 10 | 86.0 | 3.2 | 58.9 | 10.8 | 0.18 |
| Example 11 | 85.2 | 3.2 | 59.2 | 11.6 | 0.20 |
| Example 12 | 84.8 | 3.1 | 58.7 | 12.1 | 0.20 |
| Example 13 | 85.7 | 3.2 | 58.8 | 11.1 | 0.19 |
| Comparative example 4 | 84.4 | 3.0 | 58.4 | 12.6 | 0.22 |

If a comparison is made between the performances of the catalysts of example 10 and the comparative example 4 on the one hand, and those of the catalysts of example 11 and of the comparative example 4 on the other, it is noted that the catalysts of examples 10 and 11 have performances which are a clear improvement over the catalyst of prior art (comparative example 4).

In fact, the yields of light cracking products C4 obtained during the test of the two catalysts of examples 10 and 11 are very significantly lower than those observed for the catalyst of the comparative example 4.

Thus, it can be seen that the relation between the yields of cracking products C4 and the yields of aromatic compounds, called C4-/aromatics in the table above, is lower for the two catalysts according to the invention. The selectivity of the catalysts vis-à-vis the aromatic products required will become higher as this relation is lowered.

The catalysts of examples 10 and 11 containing, in addition compared to the catalyst of comparative example 4, η alumina, silicon and lanthanum, present improved specifications relative to the catalyst of comparative example 4, notably as far as weaker selectivity of cracking products is concerned, and thus improved selectivity for aromatic products.

If a comparison is made between the performances of the catalysts of examples 12 and 13, it can be noted that the catalyst of example 13 presents improved performance compared with the catalyst of example 12.

In fact, the catalyst of example 13 presents a yield in cracking products C4- which is clearly lower and a yield in aromatics which is evidently higher,. The relation between yields in cracking products C4- and the yields of aromatic compounds, called C4-/aromatics in the table above, is lower for the catalyst of example 13. The selectivity of the catalysts vis-à-vis the aromatic products required will become higher as this relation is lowered.

The catalysts of examples 12 and 13 contain, among others, silicon and lanthanum. The catalyst of example 13 has, in addition, been submitted to a is hydrothermal treatment. It presents improved specifications relative to the catalyst of example 12, notably as far as weaker selectivity of cracking products is concerned, and thus improved selectivity for aromatic products.

EXAMPLE 17

In this example, the catalysts of examples 14 and 15 and the comparative example 5 are tested, for conversion of a load of hydrocarbons with the following specifications:

| | |
|---|---|
| volume mass at 20° C. | 0.736 kg/dm³ |
| octane number required | ~38 |
| content of paraffins | 54.8% by weight |
| content of naphthenes | 33.1% by weight |
| content of aromatics | 12.1% by weight |

The following operating conditions are used:

| | |
|---|---|
| temperature | 500° C. |
| total pressure | 0.40 Mpa |
| mass flow of the load | 2.0 kg/kg of catalyst |
| length of time | 100 hr. |

At the end of the functioning period, the deactivated catalyst is regenerated through controlled combustion of the coke and adjustment of its chlorine content to around 1.10% by weight. The specific surface area of the support is measured after this regeneration. Then after activation of the catalyst at high temperature by hydrogen, the load is injected for a new functioning period. Thus, each catalyst has been submitted to 5 cycles of operation-regeneration. The specific surface areas corresponding to the beginning of the first and last cycles and the performances obtained after 15 hours of functioning for each of these two cycles are recorded in table 8 below.

TABLE 8

| Catalyst | cycle | Specific surface area (m²/gm) | Reformate yield (% by weight) | Octane number required | Aromatics yield (% by weight) | C4 yield (% by weight) |
|---|---|---|---|---|---|---|
| Example 14 | 1 | 229 | 90.0 | 101.0 | 71.7 | 6.5 |
| | 5 | 224 | 90.8 | 100.1 | 71.1 | 5.7 |
| Example 15 | 1 | 231 | 89.2 | 101.4 | 71.8 | 7.2 |
| | 5 | 222 | 90.2 | 100.3 | 70.8 | 6.4 |
| Comparative Example 5 | 1 | 219 | 88.2 | 100.9 | 70.5 | 8.5 |
| | 5 | 194 | 89.4 | 98.6 | 67.8 | 7.5 |

If a comparison is made between the performances of the catalysts of examples 14 and 15, and those of the prior art catalyst (comparative example 5), it can be seen that the catalysts of examples 14 and 15 present better yields in aromatics and better octane numbers for the reformed product. It can also be noted that these improvements are achieved without the reformed product yields being affected.

If the evolution over 5 cycles is now considered, it can be seen that the fall in the specific surface areas of examples 14 and 15 is much less than that of the prior art catalyst. This smaller fall is accompanied by better maintenance of yields in aromatics and octane numbers.

EXAMPLE 18

This example illustrates the production of a catalyst comprising a matrix formed of a mixture of $\gamma$ alumina and $\eta$ alumina, on which are deposited silicon, chlorine, zirconium, rhenium and platinum.

a) Formation of the Matrix in Alumina

First of all the alumina matrix is prepared by mechanical mixing of a powder of $\gamma$ alumina of specific surface area 220 $m^2/gm$ and a powder of $\eta$ alumina of specific surface area equal to 320 $m^2/gm$ which has been prepared by roasting bayerite. The proportion of $\eta$ alumina is 20% by weight. This mixture is then formed by extrusion, and then roasted in a current of dry air at 520° C. for 3 hours.

b) Deposit of Silicon

After cooling down, silicon is deposited on the roasted matrix by putting it into contact with an ethanolic solution of tetraethyl orthosilicate $Si(OC_2H_5)_4$. The concentration of this solution is 2.5 gm of silicon per liter. This contact is made at ambient temperature with stirring, for 2 hours. The solvent is then evaporated under reduced pressure. Then the impregnated extrusions are dried at 120° C. for 15 hours, and roasted at 530° C. in a current of dry air for 2 hours.

c) Zirconium Deposit

Then the extrusions are put into contact with an aqueous solution of zirconyl chloride $ZrOCl_2, 8H_2O$ containing 26.7 gm/l of zirconium. This contact is carried out at ambient temperature for 2 hours, and then the impregnated matrix is dried at 120° C. for 15 hours and roasted at 530° C. in a current of dry air for 2 hours.

d) Deposit of Platinum and Chlorine

Then the platinum and part of the chlorine are deposited simultaneously on this support through impregnation by a chlorinated aqueous solution containing per liter:

8.20 gm of chlorine in the form of HCl, and 1.00 gm of platinum in the form of $H_2PtCl_6$.

The solution is left in contact with the support for 2 hours. After centrifugation and drying for 4 hours at 120° C., the impregnated support is roasted at 530° C. for 3 hours in a current of dry air.

e) Deposit of Rhenium and Chlorine

Then the rhenium and the rest of the chlorine are deposited simultaneously through impregnation by a chlorinated aqueous solution containing per liter:

4.20 gm of chlorine in the form of HCl, and b 1.50gm of rhenium in the form of $ReCl_3$.

After drying, the impregnated support is roasted at 530° C. for 2 hours in a current of dry air.

f) Hydrothermal Treatment

A hydrothermal treatment is then carried out in the presence of water and chlorine. For this, the catalyst is treated at 510° C. for 2 hours in a current of 2000 $dm^3/hr$ of air for 1 kg of solid product. This air contains water and chlorine injected in a preheating zone situated upstream from the bed of solid. The molar concentrations in water and chlorine are equal to 1% and 0.05% respectively.

The specifications of the catalyst obtained are given in table 9.

EXAMPLE 19

The same operating mode is followed as for example 18 to prepare a catalyst comprising the same constituents, except that in stage c), the impregnation solution contains 13.3 gm/l of zirconium, and the hydrothermal treatment of stage f) is not applied.

The specifications of the catalyst obtained are also given in table 9.

Comparative Example 6

In this example, the same operating mode as in example 18 is followed, but in stage a) only $\gamma$ alumina is used, and one stages b) and c) for deposits of silicon and zirconium and stage f) for hydrothermal treatment are not applied.

The specifications of the catalyst obtained are also given in table 9.

EXAMPLE 20

This example illustrates the production of a catalyst comprising a matrix formed of a mixture of $\gamma$ alumina and $\eta$ alumina, comprising 8% of $\eta$ alumina, on which are deposited silicon, chlorine, zirconium, tin and platinum.

For this preparation, the same operating mode as for example 18 is followed, using in stage a) 8% by weight of $\eta$ alumina and instead of stages d) and e) carrying out a single stage of simultaneous deposit of platinum, tin, and chlorine through impregnation with a chlorinated aqueous solution containing per liter:

0.81 gm of platinum in the form $H_2PtCl_6$, and 0.96 gm of tin in the form $SnCl_2$.

The solution is left in contact with the support for 2 hours. After centrifugation and drying for 4 hours at 120° C., the impregnated support is roasted at 530° C. for 3 hours in a current of dry air.

A hydrothermal treatment in the presence of water and chlorine as in stage f) of example 18 is then carried out.

The specifications of the catalyst obtained are given in table 9.

EXAMPLE 21

The same operating mode as for example 20 is followed, to prepare a catalyst comprising the same constituents, but in stage c), the impregnation solution contains 13.3 gm/l of zirconium, and the final hydrothermal treatment in the presence of water and chlorine is not carried out.

The specifications of the catalyst obtained are also given in table 9.

Comparative Example 7

In this example, the same operating mode as for example 20 is followed, but in stage a) only $\gamma$ alumina is used and stages b) and c) for depositing silicon and zirconium and the last stage f) for hydrothermal treatment in the presence of water and chlorine are not applied.

The specifications of the catalyst obtained are also given in table 9.

TABLE 9

| Catalyst | Proportion η alumina (% weight of matrix) | Specific surface area (m²/gm) | Platinum content (weight %) | Tin content (weight %) | Rhenium content (weight %) | Chlorine content (weight %) | Silicon content (weight %) | Zirconium content (% by weight) |
|---|---|---|---|---|---|---|---|---|
| Example 18 | 20 | | 0.24 | 0 | 0.26 | 1.16 | 0.032 | 0.51 |
| Example 19 | 20 | | 0.23 | 0 | 0.23 | 1.05 | 0.032 | 0.15 |
| Compar. Example 6 | 0 | | 0.23 | 0 | 0.25 | 1.12 | 0 | 0 |
| Example 20 | 8 | 223 | 0.22 | 0.17 | 0 | 1.12 | 0.12 | 1.72 |
| Example 21 | 8 | 226 | 0.25 | 0.15 | 0 | 1.05 | 0.14 | 0.85 |
| Compar. Example 7 | 0 | 219 | 0.24 | 0.18 | 0 | 1.15 | 0 | 0 |

EXAMPLE 22

In this example, the catalysts of examples 18 and 19 and the comparative example 6 are tested, for conversion of a load of hydrocarbons with the following specifications:

| | |
|---|---|
| volume mass at 20° C. | 0.742 kg/dm³ |
| octane number required | ~41 |
| content of paraffins | 52.2% by weight |
| content of naphthenes | 32.4% by weight |
| content of aromatics | 15.4% by weight |

The following operating conditions are used:

| | |
|---|---|
| temperature | 505° C. |
| total pressure | 1.3 Mpa |
| mass flow of the load | 4.0 kg/kg of catalyst and per hr. |
| length of time | 100 hr. |

The performances of the catalysts are recorded in table 10 below, and are expressed in yields by weight and of the octane number required of the reformed product.

TABLE 10

| Catalyst | Reformate yield (% by weight) | Hydrogen yield (% by weight) | Aromatics yield (% by weight) | C4 yield (% by weight) | C4 / aromatics |
|---|---|---|---|---|---|
| Example 18 | 86.0 | 3.2 | 60.4 | 10.8 | 0.18 |
| Example 19 | 85.2 | 3.2 | 61.1 | 11.5 | 0.19 |
| Comparative example 6 | 84.4 | 3.0 | 59.8 | 12.8 | 0.21 |

If a comparison is made between the performances of the catalysts of example 18 and the comparative example 6 on the one hand, and those of the catalysts of example 19 and of the comparative example 6 on the other, it is noted that the catalysts of examples 18 and 19 have performances which are a clear improvement over the catalyst of prior art (comparative example 6).

In fact, the yields of light cracking products C4 obtained during the test of the two catalysts of examples 18 and 19 are very significantly lower than those observed for the catalyst of the comparative example 6.

Thus, it can be seen that the relation between the yields of cracking products C4 and the yields of aromatic compounds, called C4-/aromatics in the table above, is lower for the two catalysts of examples 18 and 19. The selectivity of the catalysts vis-à-vis the aromatic products required will become higher as this relation is lowered.

The catalysts of examples 18 and 19 containing, in addition to the catalyst of comparative example 6, η alumina, silicon and zirconium, present improved specifications relative to the catalyst of comparative example 6, notably as far as weaker selectivity of cracking products is concerned, and thus improved selectivity for aromatic products.

EXAMPLE 23

In this example, the catalysts of examples 20 and 21 and the comparative example 7 are tested, for conversion of a load of hydrocarbons with the following specifications:

| | |
|---|---|
| volume mass at 20° C. | 0.742 kg/dm³ |
| octane number required | ~41 |
| content of paraffins | 44.2% by weight |
| content of naphthenes | 39.4% by weight |
| content of aromatics | 16.4% by weight |

The following operating conditions are used:

| | |
|---|---|
| temperature | 505° C. |
| total pressure | 0.75 Mpa |
| mass flow of the load | 2.5 kg/kg of catalyst |
| length of time | 100 hr. |

At the end of the functioning period, the deactivated catalyst is regenerated through controlled combustion of the coke and adjustment of its chlorine content to around 1.10% by weight. The specific surface area of the support is measured after this regeneration. Then after activation of the catalyst at high temperature by hydrogen, the load is injected for a new functioning period. Thus, each catalyst has been submitted to 5 cycles of operation-regeneration. The specific surface areas corresponding to the beginning of the first and last cycles and the performances obtained after 15 hours of functioning for each of these two cycles are recorded in table 11 below.

TABLE 11

| Catalyst | cycle | Specific surface area (m²/gm) | Reformate yield (% by weight) | Octane number required | Aromatics yield (% by weight) | C4 yield (% by weight) |
|---|---|---|---|---|---|---|
| Example 20 | 1 | 223 | 89.7 | 102.1 | 73.3 | 6.6 |
|  | 5 | 212 | 90.7 | 100.7 | 71.9 | 5.8 |
| Example 21 | 1 | 226 | 90.4 | 101.9 | 73.6 | 5.9 |
|  | 5 | 209 | 90.7 | 100.5 | 71.6 | 5.7 |
| Comparative Example 7 | 1 | 219 | 89.2 | 102.0 | 72.8 | 7.3 |
|  | 5 | 196 | 90.2 | 100.2 | 70.7 | 6.4 |

If a comparison is made between the performances of the catalysts of examples 20 and 21, and those of the prior art catalyst (comparative example 7), it can be seen that the catalysts of examples 20 and 21 present better yields in aromatics and better octane numbers for the reformed product. It can also be noted that these improvements are achieved without the reformed product yields being affected.

If the evolution over 5 cycles is now considered, it can be seen that the fall in the specific surface areas of examples 20 and 21 is much less than that of the prior art catalyst. This smaller fall is accompanied by better maintenance of yields in aromatics and octane numbers.

The process of the invention thus makes it possible to improve in a substantial way the results obtained by the conversion of hydrocarbons into aromatic components, in terms of selectivity and stability during the reaction cycles.

We claim:

1. A process for the conversion of hydrocarbons into aromatic compounds, comprising contacting a composition comprising hydrocarbons with a catalyst under temperature and pressure conditions to produce said aromatic compounds, wherein the catalyst comprises:
   a matrix containing 0 to 100% by weight of η transition alumina, and the remaining weight percentage of the matrix, up to 100%, consisting of γ transition alumina, and, relative to the total weight of the catalyst:
   from 0.01 to 2% by weight of silicon,
   from 0.1 to 15% by weight of at least one halogen selected from the group consisting of fluorine, chlorine, bromine and iodine,
   from 0.01 to 2% by weight of at least one noble metal selected from the platinum group, and
   from 0.005 to 10% by weight of at least one promoter metal selected from the group consisting of tin, germanium, indium, gallium, thallium, antimony, lead, rhenium, manganese, chromium, molybdenum and tungsten,
   said catalyst having been previously treated hydrothermally at a temperature of 300 to 1000° C. in a gaseous atmosphere containing steam, wherein the water molar content of the gaseous atmosphere is at least 0.05%.

2. The process in accordance with claim 1, wherein the matrix contains from 3 to 70% by weight of the η transition alumina.

3. The process in accordance with claim 1, wherein the catalyst further comprises, relative to the total weight of the catalyst, from 0.001 to 8% by weight of at least one doping metal selected from the group consisting of the alkali metals and the alkaline-earth metals.

4. The process in accordance with claim 3, wherein the doping metal is potassium.

5. The process in accordance with claim 1, wherein the catalyst further comprises, relative to the total weight of the catalyst, from 0.001 to 10% by weight of at least one doping metal selected from the group consisting of titanium, zirconium, hafnium, cobalt, nickel and zinc.

6. The process in accordance with claim 5, wherein the doping metal is zirconium.

7. The process in accordance with claim 1, wherein the catalyst further comprises, relative to the total weight of the catalyst, from 0.001 to 10% by weight of at least one doping metal selected from the lanthanide series.

8. The process in accordance with claim 7, wherein the doping metal is lanthanum.

9. The process in accordance with claim 1, wherein the silicon content of the catalyst is from 0.01 to 1% by weight.

10. The process in accordance with claim 1, wherein the halogen content of the catalyst is from 0.2 to 10% by weight.

11. The process in accordance with claim 1, wherein the total noble metal content of the catalyst is between 0.1 and 0.8% by weight.

12. The process in accordance with claim 1, wherein the promoter metal is selected from the group consisting of rhenium, manganese, chromium, molybdenum, tungsten, indium and thallium.

13. The process in accordance with claim 12, wherein the promoter metal is rhenium.

14. The process in accordance with claim 1, wherein the promoter metal is selected from the group consisting of tin, germanium, indium, antimony, lead, thallium and gallium.

15. The process in accordance with claim 14, wherein the promoter metal is tin.

16. The process in accordance with claim 1, wherein the halogen is chlorine.

17. The process in accordance with claim 1, wherein the noble metal is platinum.

18. The process in accordance with claim 1, wherein the hydrothermal treatment is conducted for a period of 1 minute to 30 hours in a gaseous atmosphere having a water molar content between 0.05 and 100%.

19. The process in accordance with claim 1, wherein the water molar content is between 1 and 50%.

20. The process in accordance with claim 1, wherein the period of hydrothermal treatment is from 1 to 10 hours.

21. The process in accordance with claim 1, wherein the gaseous atmosphere further comprises at least one halogen.

22. The process in accordance with claim 21, wherein the halogen content of the gaseous atmosphere is at most 20% in mol.

23. The process in accordance with claim 21, wherein the halogen content of the gaseous atmosphere is at most 10% in mol.

24. The process in accordance with claim 21, wherein the halogen content of the gaseous atmosphere is at most 2% in mol.

25. The process in accordance with claim 1, wherein the gaseous atmosphere is air, oxygen, argon or nitrogen.

26. The process in accordance with claim 1, wherein said hydrocarbons comprise paraffin, naphthenic and aromatic hydrocarbons having from 5 to 12 carbon atoms, and are contacted with the catalyst at a temperature of 400 to 700° C. under a pressure ranging from atmospheric pressure to 4 MPa.

27. The process in accordance with claim 12, wherein the pressure ranges from 0.1 to 0.9 MPa.

28. The process in accordance with claim 14, wherein the pressure ranges from 0.1 to 0.9 MPa.

29. The process in accordance with claim 26, wherein the hydrocarbons are contacted with the catalyst under a mass flow of composition ranging from 0.1 to 10 kg of hydrocarbons per kg of catalyst per hour.

30. The process in accordance with claim 1, wherein the conversion of said hydrocarbons to said aromatic compounds is a catalytic reforming operation.

31. The process in accordance with claim 1, wherein said matrix contains from 0.1 to 99% by weight of $\eta$ transition alumina, and the remaining weight percentage of the matrix, up to 100% consisting of $\gamma$ transition alumina.

* * * * *